United States Patent [19]

Tsugita

[11] Patent Number: 5,021,874

[45] Date of Patent: Jun. 4, 1991

[54] WHITE BALANCE ADJUSTING DEVICE FOR USE IN A CAMERA

[75] Inventor: Makoto Tsugita, Tokyo, Japan

[73] Assignee: Fuji Photo Film Co., Ltd., Kanagawa, Japan

[21] Appl. No.: 337,093

[22] Filed: Apr. 12, 1989

[30] Foreign Application Priority Data

Apr. 20, 1988 [JP] Japan .................................. 63-99011

[51] Int. Cl.[5] ......................... H04N 9/04; H04N 9/73
[52] U.S. Cl. ...................................... 358/29; 358/28; 358/41
[58] Field of Search .................. 358/29, 28, 29 C, 41, 358/139, 10

[56] References Cited

U.S. PATENT DOCUMENTS

| | | | |
|---|---|---|---|
| 4,249,197 | 2/1981 | Van Spaandonk | 358/10 |
| 4,490,487 | 2/1985 | Takayama | 358/29 C |
| 4,590,512 | 5/1986 | Kondo | 358/29 |
| 4,605,955 | 8/1986 | Hashimoto | 358/29 C |
| 4,727,413 | 2/1988 | Miura | 358/29 |
| 4,750,032 | 6/1988 | Nakayama | 358/29 C |
| 4,774,564 | 9/1988 | Konishi | 358/29 |
| 4,805,011 | 2/1989 | Sase | 358/29 C |

*Primary Examiner*—Tommy P. Chin

[57] ABSTRACT

A white balance adjusting device is disclosed for use in a camera which picks up an image of a field and creates a video signal representing the field. In the white balance adjusting device, the white balance of the video signal can be adjusted by control device in accordance with the color temperature signal that is detected by a color temperature detecting device and the light measurement signal that is obtained from a light measuring device. The control device judges that the weather is fine when the brightness of the field is equal to or greater than a given value and a color temperature detected is higher than the color temperature of the direct light of the sun, and performs a control operation so that the white balance adjustment can be achieved in accordance with the color temperature that corresponds to the fine weather. Therefore, according to the white balance adjusting device, the white balance adjustment can be carried out with accuracy even when taking a picture under the normal light in fine weather.

11 Claims, 2 Drawing Sheets

WHITE BALANCE ADJUSTING DEVICE FOR USE IN A CAMERA

BACKGROUND OF THE INVENTION

1. Field of the Invention

The present invention relates to a white balance adjusting device for use in a camera which picks up an image of a field and then creates a video signal representing the field.

2. Description of the Related Art

Generally, in a video camera, it is necessary to adjust a white balance in a video signal according to kinds of illumination light to be used in photographing.

This is because, in view of the fact that a color video camera has no adaptability with respect to colors unlike the human eyes, the white balance must be adjusted so that the black and white colors of the field can be observed as the same black and white colors in a monitor image receiving device as well. Thus, in order that the color separation components of a video signal obtained from an image pickup device can be uniform, the amplitude gains of the color separation components are to be adjusted (which is generally referred to as a white balance adjustment) according to the color temperatures of the illumination light used.

In a conventional white balance adjusting device of this type, there is provided a color temperature sensor in a camera and the white balance can be automatically adjusted in accordance with the color temperatures that have been sensed by the color temperature sensor.

In the above-mentioned conventional white balance adjusting device for use in a camera, when taking a picture in fine weather conditions in the normal light, if the blue sky occupies a larger share with respect to the angle of field, the color temperature detects a color temperature higher than that of a daylight in the fine weather conditions. That is, a color temperature which corresponds to a temperature in the shade is detected, in spite of the blue sky. Therefore, in this case, if the white balance is adjusted in accordance with the detection output of the color temperature sensor, then the adjusted colors go toward a yellow color from the color balance that they originally ought to be. Thus is, a proper white balance adjustment cannot be performed.

SUMMARY OF THE INVENTION

The present invention aims at eliminating the drawbacks found in the above-mentioned prior art devices.

Accordingly, it is an object of the invention to provide a white balance adjusting device for use in a camera which is capable of adjusting a white balance accurately, even when taking a picture for the normal light in fine weather conditions.

In order to attain the above object, according to the invention, there is provided a white balance adjusting device for use in a camera which picks up an image of a field and creates a video signal representing the field. The white balance adjusting device includes a color temperature detecting device for detecting the color temperature of the field and outputting a color temperature signal representing the detected color temperature; a light measuring device for detecting the brightness of the field and outputting a light measurement signal representing the detected brightness; a white balance adjusting device for adjusting the white balance of the above-mentioned video signal; and a control device for taking in the output signals of the color temperature detecting device and light measuring device and for controlling the white balance adjusting device in accordance with the output signals from the color temperature detecting device and light measuring device, wherein the control means judges that the weather is fine when the detected field brightness is equal to or greater than a predetermined value and the detected color temperature is higher than the color temperature of the direct light of the sun. It controls the white balance adjusting device such that it performs the white balance adjustment in accordance with the color temperature that corresponds to the fine weather conditions.

According to the white balance adjusting device for use in a camera constructed in accordance with the present invention, the white balance of the video signal can be adjusted by the control device in accordance with the color temperature signal output from the color temperature detecting device as well as the light measurement signal output from the light measuring device.

Also, the control device judges that the weather conditions are fine when the detected field brightness is equal to or greater than a predetermined value as well as the detected temperature is higher than the color temperature of the direct light of the sun. It therefore controls such that the white balance adjustment can be performed in accordance with the color temperature that corresponds to the fine weather conditions. This is based on the fact that, in fine weather conditions, it is brighter in the sun than it is in the shade.

According to the present invention, even when taking a picture in the normal light in fine weather conditions, the white balance can be adjusted with accuracy.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiment of a device for adjusting the white balance of an image of a field to be photographed according to the present invention with reference to the accompanying drawings.

Figure 1:
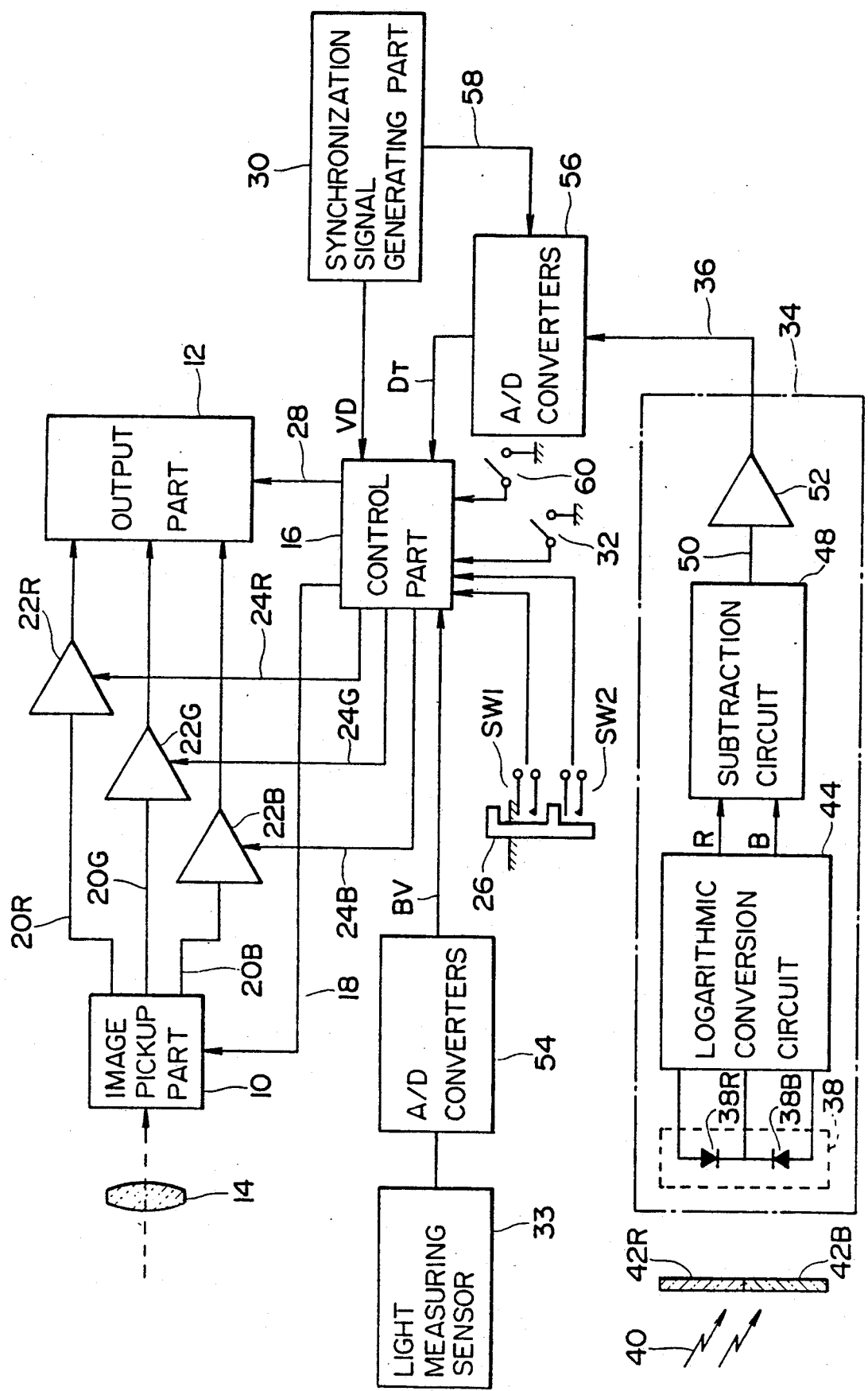
FIG. 1 is a block diagram to illustrate the structure of an embodiment of a white balance adjusting device for use in a camera according to the invention; and, FIG. 2 is a flow chart to illustrate the contents of processings to be executed by a control part shown in FIG. 1.

Referring now to FIG. 1, there is shown a block diagram of the structure of an embodiment of a white balance adjusting device for use in a camera according to the invention. In FIG. 1, the white balance adjusting device mainly includes an image pickup part 10, three amplifiers 22R, 22G, 22B which are respectively adapted to amplify the respective separation color signals 20R, 20G, 20B of the three primary colors that are output from the image pickup part 10, an output part 12, a control part 16, a synchronization signal generating part 30, a light measuring sensor 33, a mode selection switch 32 which is adapted to select a single photograph mode or a sequential photograph mode, a color temperature detecting part 34, two A/D converters 54 and 56, and a mode setting switch 60 for setting a photograph mode.

The image pickup part 10 has an image pickup mechanism including a color solid image pickup device such as a CCD or the like. The image pickup device includes an image pickup cell array on which an image of an object is formed by an image pickup lens 14. The image pickup device creates a video signal which corresponds to the thus formed object image.

The image pickup part 10 receives a drive clock from the control part 16 via a control line 18. Responsive to this, it outputs to the amplifiers 22R, 22G, 22B the signals that are separated into three primary color components R, G, B, respectively.

Also, the image pickup part 10 further includes a shutter and a stop diaphragm which can be used to limit the exposure to the image pickup device. Such operation can be controlled by the control part 16 through the control line 18.

The above-mentioned amplifiers 22R, 22G, 22B are variable-gain amplifiers which are adapted to be able to adjust the amplification gains thereof in accordance with control signals 24R, 24G, 24B, output from the control part 16.

The mode setting switch 60 is a switch which is adapted to set either a still mode for photographing an object as a still image or a movie mode for photographing the object as a movie camera. In particular, when switched on, the mode setting switch 60 sets the movie mode and, when switched off, it sets the still mode.

The output part 12, in particular, includes an output terminal which is used to output externally of the device the video signal that are respectively output from the amplifiers 22R, 22G, 22B, a recording part for recording the video signals into a magnetic disc as still images, and a switching circuit which is adapted to switch the video signals output from the amplifiers 22R, 22G, 22B either to the output terminal side thereof or to the still image recording part side thereof according the photograph modes, by means of a control signal 28 which is output from the control part 16. In order to allow the white balance adjusting device to perform the function of a movie camera when the photograph mode is set for the movie mode, the output part 12 is constructed such that a movie adapter, which is a recording part for recording the video signals onto a video tape, can be connected to the above-mentioned output terminal thereof.

The control part 16 is composed of a microcomputer and the like. That is, the control part 16 is a control circuit which is adapted to control the respective parts of the white balance adjusting device responsive to a vertical synchronization signal VD to be supplied from the synchronization signal generating part 30 to a control line 31. For example, responsive to the photographing instruction that is given by an operator, it controls the exposure of the image pickup part 10, or controls the recording and outputting operations of the output part 12. Also, in photographing, the control part 16 is able to perform various kinds of controls such as a focusing control, an exposure adjustment, a white balance adjustment and the like.

The light measuring sensor 33 is a sensor which is adapted to detect the brightness of the field and to output a light measurement signal which represents the detected field brightness. The light measurement signal 35 thereof is output to the control part 16 as the light measurement data BV by means of the A/D converter 54.

The color temperature detecting part 34 is a circuit which is adapted to detect the color temperature of the field and to output a color temperature signal which corresponds to the detected color temperature. The color temperature signal 36 thereof can be output to the control part 16 through the A/D converter 56.

Also, the color temperature detecting part 34 includes a color temperature detecting element 38 which is adapted to receive an incident light 40 from a field to which the image pickup lens 14 faces and to change its photo-electric current responsive to the received light. On the incident light side of the color temperature detecting element 38, there are arranged an optical filter 42R for freely passing the red component (R) of the incident light 40 and an optical filter 42B for freely passing the blue (B) component thereof.

The above-mentioned color temperature detecting element 38 includes a pair of photodiodes 38R and 38B which are connected in series to each other at the respective opposite polarities thereof, and the respective connection points of the photodiodes 38R and 38B and the two terminals of the thus formed series circuit are connected to a logarithmic conversion circuit 44. The two photodiodes 38R and 38B are disposed so as to correspond to the optical filters 42R and 42B, respectively. The logarithmic conversion circuit 44 is a circuit which is adapted to logarithmically compress the currents that flow in the photodiodes 38R and 38B according to the photo-sensitive electric currents thereof, respectively, and, from the connection points of the two photodiodes 38R, 38B and the two terminals of the these series circuits, a signal R corresponding to the R component of the incident light 40 and a signal B corresponding to the B component of the incident light 40 are output to a subtraction circuit 48. The subtraction circuit 48 is an operational circuit which finds a difference between the two signals R and B and outputs to an amplifier a D.C. level signal which corresponds to the difference and the polarity thereof.

Referring now to a release button 26, it can be operated in a two-stage stroke manner. During the first-stage stroke operation of the release button 26, a switch SW1 is closed to thereby supply power to the respective circuit parts, and, if the release button 26 is further depressed, then a switch SW2 can be closed. At the time when the switch SW2 is closed, the control part 16 is operated such that it performs the shutter release, photographing and recording operations.

The mode select switch 32 is a switch selects either a single photograph mode, in which, when the shutter release operation is executed, only a frame of a field is photographed and a video signal representing the still image of the field is recorded into a recording medium, or a sequential photograph mode in which, during the shutter release operation, the field image of the field are successively picked up each given time and video signals respectively representing the still images thereof are recorded into the recording medium. In the sequential photograph mode, while the switch SW2 of the release button 26 is on, the images of the field are picked up and recorded every given time (for example, every 1/6 sec., every 1/10 sec.).

The sequential photographing operation is performed when the mode select switch 32 is set in the sequential photograph mode (that is, it is in the on-state thereof)

and the release button 26 is depressed, such that the switch SW2 is turned on.

In the above-mentioned structure, the light measuring sensor 33 outputs an analog electric signal 35 which corresponds to the brightness of the field. Then the analog signal 35 is converted to a digital signal by the A/D converter 54 and is then output to the control part 16 as the light measuring data BV.

On the other hand, according to the ratio between the R and B components of the incident light 40, a difference is generated between the photo-sensitive electric currents flowing in the two photodiodes 38R and 38B. This difference is then input to the logarithmic conversion circuit 44 as an electric signal. This electric signal is logarithmically compressed by the logarithmic conversion circuit 44 and is then input to the subtraction circuit 48. Then, the subtraction circuit 48 finds a difference between the two components R and B of the incident light 40. A signal representing this difference is then amplified by an amplifier 52 and is then output therefrom as a D.C. level signal. In particular, this signal is output in the form of a D.C. level signal having a positive or negative sign which corresponds to the magnitude of the difference between the R and B components and the polarity thereof. The A/D converter 56, upon receiving a clock signal 58 from the synchronization signal generating part 30, converts the D.C. level signal to its corresponding digital data and then outputs the digital data to the control part 16.

The control part 16 takes in the light measurement data BV representing the brightness of the field from the light measuring sensor 33 through the A/D converter 54, inputs the data representing the difference between the R and B components of the incident light, (that is, the color temperature data $D_T$ from the A/D converter 56 in synchronization with a vertical synchronization signal VD which is output from the synchronization signal generating part 30), and then analyzes these data to thereby judge the color temperature of the incident light 40. In accordance with such judgements thereof, the controls part 16 controls the gains of the variable-gain amplifiers 22R and 22B or, in some cases, adjust the gain of the variable-gain amplifier 22G. With respect to the white light that enters the image pickup part 10 through the image pickup lens 14, the levels of the components of the video signals output from the three amplifiers 22R, 22G and 22B to the output part 12 can be relatively and substantially equal. Due to this, the white balance of the video signal obtained in the output part 12 can be adjusted with accuracy.

Figure 2:
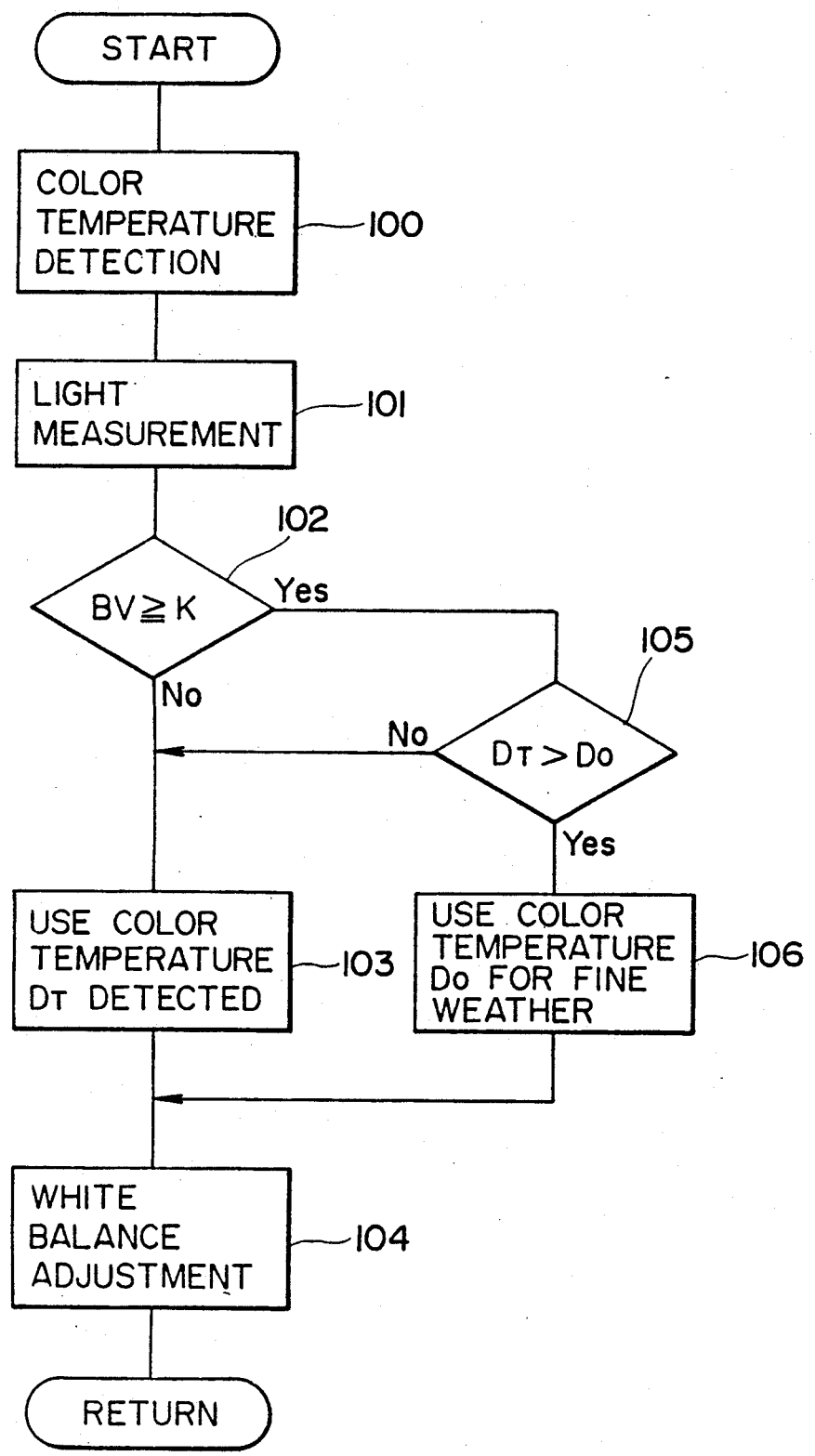

Next, description will be given below of the contents of the processings to be executed by the control part 16 with reference to FIG. 2. In FIG. 2, if the switch SW1 is closed by depressing of the release button 26, then the program is initiated. Thus, the color temperature of the light of the field is detected by the color temperature detecting part 34 and the light measurement is carried out by the light measuring sensor 33 (Steps 100, 101).

After that, it is checked whether the light measurement data BV obtained from the A/D converter 54 is equal to or greater than K. Thus, it is detected whether $BV \geq K$ or not (where K is a given value, for example, if expressed by a BV value, K=6. In the case of a film having a film sensitivity of ISO 100, K corresponds to an amount of light obtained when a diaphragm is F4 and a shutter speed is set as 1/125 sec.), (Step 102).

If $BV<K$ is found, then the color temperature represented by the color temperature data $D_T$, which is detected by the color temperature detecting part 34 and is obtained by the A/D converter 56, is used for adjustment of the white balance and the gains of the variable-gain amplifiers 22R, 22G, 22B are respectively controlled by the control part 16. Therefore the white balance adjustment can be performed (Steps 103, 104).

On the other hand, if $BV \geq K$ is found, then the color temperature data $D_T$ obtained from the A/D converter 56 is compared with the data $D_O$ that represents the color temperature of the direct light of the sun (in fine weather conditions), (Step 105). If $D_T \leq D_O$, then the white balance can be adjusted in accordance with the color temperature data $D_T$ representing the detected color temperature (Steps 103, 104).

Also, if $D_T > D_O$, then the control part 16 judges that the conditions are fine, that is, the device is not in the shade. Thus the white balance adjustment is performed in accordance with the color temperature data $D_O$ representing the color temperature for the fine weather conditions are (Steps 106, 104).

As has been described hereinbefore, according to the present invention, the white balance adjusting device is constructed such that it judges that the weather conditions are fine when the brightness of the field is equal to or greater than a given value and the detected color temperature is higher than the color temperature of the direct light of the sun. It then performs the white balance adjustment in accordance with the color temperature corresponding to the fine weather conditions. Therefore, according to the invention, even when the field is photographed under the normal light with the fine weather conditions, the white balance can be adjusted with accuracy.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A white balance adjusting apparatus for use in a camera which picks up an image of a field and creates a video signal representing the field, said white balance adjusting apparatus comprising:
   color temperature detecting means for detecting the color temperature of said field and outputting a color temperature signal representing said detected color temperature.
   light measuring means for detecting the brightness of said field and outputting a light measurement signal representing said detected field brightness;
   white balance adjusting means for adjusting the white balance of said video signal; and,
   control means, operatively connected to said color temperature detecting means, said light measuring means, and said white balance adjusting means, for receiving output signals of said color temperature detecting means and light measuring means and for controlling said white balance adjusting means in accordance with said output signals,
   said control means judging that the weather conditions are fine upon said light measurement signal representing said field brightness being at least equal to a predetermined value and said detected color temperature being greater than a predetermined value equal to the color temperature of the direct light of the sun and thus controlling said white balance adjusting means such that it performs said white balance adjustment in accordance with the predetermined value equal to the color temperature of the direct light of the sun corresponding to the fine weather conditions.

2. The white balance adjusting apparatus of claim 1, wherein said color temperature detecting means includes a color temperature detecting element for generating photo-electric currents which respectively correspond to a ratio of red (R) and blue (B) color components of color separation components of an incident light;

logarithmic conversion means for logarithmically compressing two electric current signals output from said color temperature detecting element and respectively corresponding to the ratio of said R and B color components of said incident light;

subtraction means for detecting a difference between two signals respectively output from said logarithmic conversion means and representing said R and B components of said incident light, and for outputting a D.C. level signal which corresponds to said detected difference and a polarity thereof; and amplifier means for amplifying an output signal of said subtraction means up to a predetermined level.

3. The white balance adjusting apparatus of claim 2, wherein said color temperature detecting element includes a pair of photodiodes which are disposed such that polarities thereof are opposed to each other and are connected in series to each other to form a series circuit, and photo-electric currents that flow between connection points thereof and two terminals of said series circuit can be input to said logarithmic conversion means as the two electric current signals.

4. The white balance adjusting apparatus of claim 3, wherein said light measuring means includes a light measuring sensor for sensing and detecting said field brightness and an analog to digital converter for A/D converting an analog light measurement signal that is output from said light measuring sensor into a digital signal.

5. The white balance adjusting apparatus of claim 4, wherein said white balance adjusting means includes three variable-gain amplifiers which are respectfully used to amplify color separation signals which respectively correspond to the three primary colors, red (R), green (G), and blue (B) of said video signal.

6. The white balance adjusting apparatus of claim 5, wherein said control means includes a microcomputer.

7. The white balance adjusting apparatus of claim 1, wherein,
said control means judges the weather conditions as abnormal upon said light measuring signal representing said field brightness being less than said predetermined value and subsequently controlling said white balance adjusting means such that it performs said white balance adjustment in accordance with the color temperature signal representing the detected color temperature, corresponding to abnormal weather conditions.

8. The white balance adjusting apparatus of claim 1, wherein:
said control means judges the weather conditions as abnormal upon the predetermined value equal to the color temperature of the direct light of the sun being at least equal to the color temperature signal representing the detected color temperature and subsequently controlling said white balance adjusting means such that it performs said white balance adjustment in accordance with the color temperature signal representing the detected color temperature, corresponding to abnormal weather conditions.

9. A method of adjusting white balance based upon weather conditions, for use in a camera which picks up an image of a field and creates a video signal representing the field, the method comprising the steps of:
(a) detecting color temperature of the field and outputting a color temperature signal representing the detected color temperature;
(b) detecting brightness of the field and outputting a light measurement signal representing the detected field brightness;
(c) judging the weather conditions as normal upon the light measurement signal of step (b) being at least equal to a predetermined value and the color temperature signal of step (a) being greater than a predetermined value equal to the color temperature of the direct light of the sun;
(d) adjusting the white balance of the video signal in accordance with the predetermined value equal to the color temperature of the direct light of the sun, upon judging weather conditions to be normal, thereby corresponding to fine weather conditions.

10. The method of claim 9, further including step:
(e) adjusting the white balance of the video signal in accordance with the color temperature signal of step (a) upon the light measurement signal of step (b) being less than a predetermined value, thereby corresponding to abnormal weather conditions.

11. The method of claim 9, further including step:
(f) adjusting the white balance of the video signal in accordance with the color temperature signal of step (a) upon the predetermined value equal to the color temperature of the direct light of the sun being at least equal to the color temperature signal of step (a).

* * * * *